J. A. MAHR.
DRIVE WHEEL TIRE HEATING DEVICE.
APPLICATION FILED JULY 14, 1909.
945,968.
Patented Jan. 11, 1910.
2 SHEETS—SHEET 2.
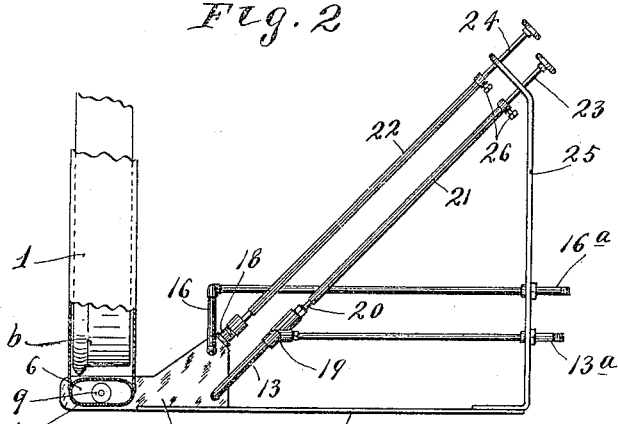
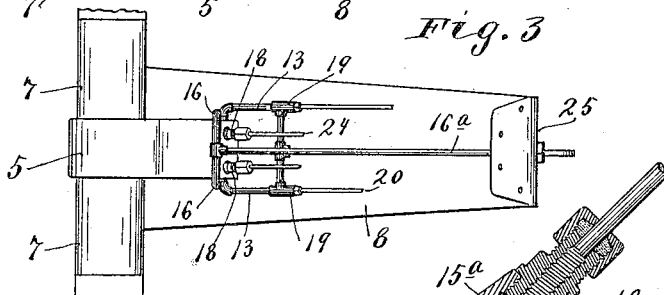
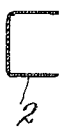
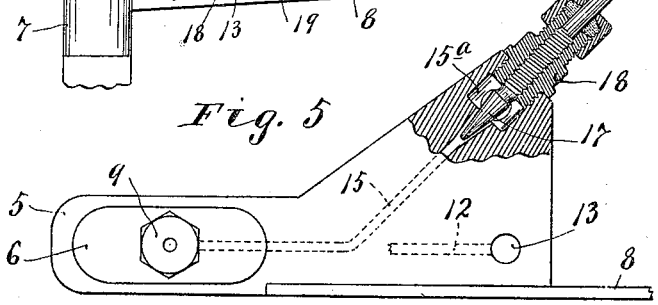
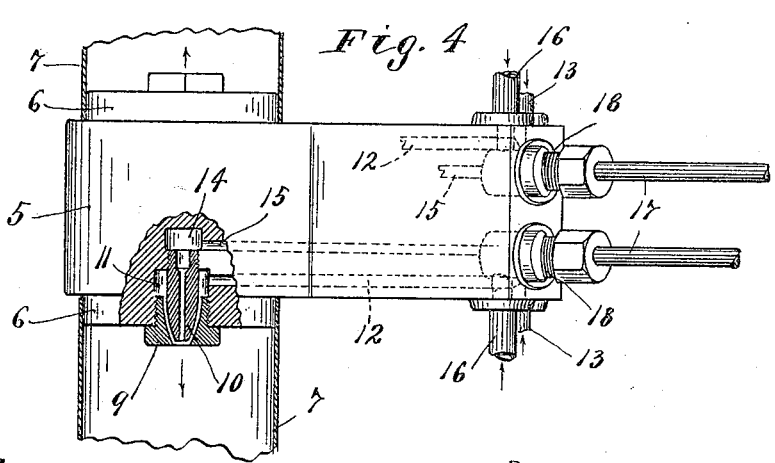
Witnesses
A. H. Opsahl.
Alice V. Swanson.
Inventor
J. A. Mahr.
By his Attorneys
Williamson & Merchant

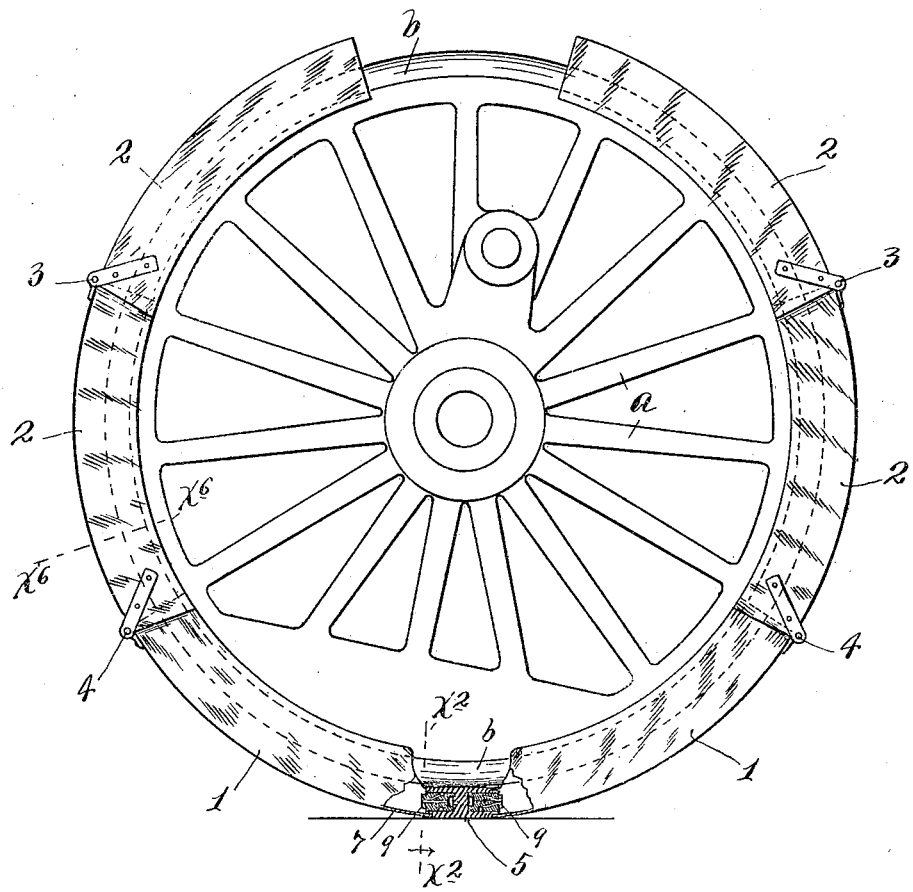

UNITED STATES PATENT OFFICE.

JULIUS A. MAHR, OF MINNEAPOLIS, MINNESOTA.

DRIVE-WHEEL-TIRE-HEATING DEVICE.

945,968.                    Specification of Letters Patent.    Patented Jan. 11, 1910.

Application filed July 14, 1909.   Serial No. 507,532.

*To all whom it may concern:*

Be it known that I, JULIUS A. MAHR, a citizen of the United States, residing at Minneapolis, in the county of Hennepin and State of Minnesota, have invented certain new and useful Improvements in Drive-Wheel-Tire-Heating Devices; and I do hereby declare the following to be a full, clear, and exact description of the invention, such as will enable others skilled in the art to which it appertains to make and use the same.

My invention has for its object to provide an improved tire heating device especially adapted for heating drive wheel tires for the purpose of removing the same from the wheels and applying the same to the wheels.

To the above ends, the invention consists of the novel devices and combinations of devices hereinafter described and defined in the claims.

In the accompanying drawings, which illustrate the invention, like characters indicate like parts throughout the several views.

Referring to the drawings: Figure 1 is a view in side elevation with some parts broken away, showing the tire heating device applied to the tire of a locomotive drive wheel; Fig. 2 is a transverse vertical section taken through the tire heating device on the line $x^2$ $x^2$ of Fig. 1, some parts being broken away; Fig. 3 is a plan view of the tire heating device shown in Fig. 1, some parts being broken away; Fig. 4 is a detail view in plan with some parts broken away and some parts sections, showing the burners of the device and the valve mechanism for controlling the same; Fig. 5 is a side elevation of the parts shown in Fig. 4, some parts being broken away and some parts being removed; Fig. 6 is a section taken through the sheath of the tire heating device on the line $x^6$ $x^6$ of Fig. 1.

The character *a* indicates an engine drive wheel; the character *b* indicates the tire thereof.

In this improved device, I provide a sectional annular sheath which is channel-shaped in cross section and adapted to embrace the tire or the main portion thereof. This sheath is made up of segmental sections 1 and 2. The sections 2 are connected to each other by hinged joints 3 and the lower sections 2 are connected to the bottom sections 1 by similar hinge joints 4, which hinge joints are located at the exterior of said casing. The segmental sheath sections 1 are preferably formed from sheet steel, and preferably there is a gap left between the upper ends of the sheath sections 2 for the discharge of flame from burners presently to be described. In actual practice, the free ends of the upper sections 2 will be secured, one to the other, by any suitable means, not shown.

The lower ends of the bottom sheath sections 1 are rigidly secured to a base block 5, which as shown, is provided on its opposite faces with flattened or transversely elongated hubs 6, and the lower ends of the said sheath sections 1 are terminated in flattened collars 7 that are telescoped onto the said hubs 6 and rigidly secured thereto. The base block 5 is extended to one side of the tire inclosing sheath and its extended portion is rigidly secured to a base plate 8. The base block 5 is provided with two burners which are arranged to deliver the oil in opposite directions, one into each of the bottom sheath sections 1. Each of these burners comprises an air delivery nozzle 9 and an oil delivery nozzle 10, the latter of which is concentrically located within the former, but spaced apart therefrom, as best shown in Fig. 4. Air nozzle 9, as shown, communicates with an enlarged extremity 11 of the long air conduit 12 formed in the block 5 and connected at its outer extremity to an air supply pipe 13. The oil nozzle 10 communicates with the enlarged extremity 14 of a long oil delivery conduit 15 formed in the said block 5 and connected at its outer extremity to an oil delivery pipe 16. The said conduits 12 and 15 are, of course, in duplicate. The oil conduits 15 are adapted to be opened and closed by needle valves 17 (see Figs. 4 and 5) which as shown, are screwed into sleeves 18, which in turn, are screwed into enlarged intermediate portions 15ª of the said conduits 15. In the air delivery pipes 13, valve casings 19 are interposed and the air delivery passages through these casings are adapted to be opened and closed by needle valves of the same construction as the valves 17 and the stems 20, which are as shown, connected to operating tubes 21. The stems of the said valves 17 are also shown as connected to operating tubes 22. The tubes 21 and 22 are provided with telescopically extensible rods 23 and 24 respectively that are mounted to rotate and to slide through an upright bearing 25 secured at its lower end to the base plate 8. Outward of the valves 17, the casings 19 are connected to a common air supply pipe 13ª; and outward of the valves 17, the pipes 16 are connected to a common oil delivery pipe 16ª, which pipes 13ª and 16ª, as shown, are supported in part by the upright bearing 25. The extensible rods 23 and 24 are preferably rigidly but adjustably secured to their respective sleeves 21 and 22 by set screws 26. The oil pipe 16ª and air pipe 13ª are connected respectively to suitable sources of oil and air supply under pressure. In practice, crude oil has been generally used on account of its cheapness and high efficiency, but any other suitable hydro-carbon oil fluid fuel, such as gas for that matter, might be used.

When the sheath is to be applied or a tire is to be removed therefrom, the upper sections 2 are turned downward on their hinges, while the lower sections 1 are being positioned under the tire and then the said sections 2 are turned back to operative positions so that they inclose the tire with an annular combustion chamber extending around the periphery thereof. The flame or products of combustion from the two burners will be delivered in reverse directions and traveling upward, will be discharged at the gap between the upper extremities of the upper sections 2 and are thus caused to completely envelop the tire, and thus to very rapidly heat the same.

In actual practice, the efficiency of the above described tire heating device has been demonstrated.

What I claim is:

1. In a tire heating device, a channel-shaped sheath made up of segmental sections connected for hinge-like closing and opening movements, formed at its upper portions with an opening for the discharge of the products of combustion and provided at its lower portions with flame supplying means, substantially as described.

2. In a tire heating device, the combination with a base block having burners projecting in opposite directions, of a sheath made up of segmental channel-shaped sections, the bottom members of which are connected to said base block and the upper sections of which sheath are connected together and to the said bottom sheath sections by hinge joints.

3. In a tire heating device, the combination with a base block having oil and air delivery ports and reversely projecting burners, of a sheath made up of segmental sections connected by hinges, the bottom sections of the sheath being connected to said base block and the upper extremities of the upper sheath sections being terminated short of each other to afford a flame discharge passage, substantially as described.

In testimony whereof I affix my signature in presence of two witnesses.

JULIUS A. MAHR.

Witnesses:
ALICE V. SWANSON,
HARRY D. KILGORE.